US011854568B2

(12) United States Patent
Tal et al.

(10) Patent No.: US 11,854,568 B2
(45) Date of Patent: Dec. 26, 2023

(54) DIRECTIONAL VOICE SENSING USING COHERENT OPTICAL DETECTION

(71) Applicant: Apple Inc., Cupertino, CA (US)

(72) Inventors: Eran Tal, Petach Tikva (IL); Ariel Lipson, Tel Aviv (IL)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 17/477,382

(22) Filed: Sep. 16, 2021

(65) Prior Publication Data
US 2023/0083807 A1    Mar. 16, 2023

(51) Int. Cl.
*G10L 21/0232* (2013.01)
*G01S 15/89* (2006.01)
(Continued)

(52) U.S. Cl.
CPC ........... *G10L 21/0232* (2013.01); *G01H 9/00* (2013.01); *G01S 7/52046* (2013.01);
(Continued)

(58) Field of Classification Search
CPC . G10L 21/0232; G10L 25/84; G10L 21/0216; G10L 21/0272; G10L 21/0208; H01H 9/00; G01S 7/52046; G01S 7/52; G01S 15/8993; G01S 15/89; H04R 1/222; H04R 1/22; H04R 23/008; H04R 23/00; H04R 3/00; H04R 3/005; H04B 10/11; G02B 27/017; G02B 27/0093; G06F 3/011; G06F 3/167; G06F 3/14; G06F 3/016; A61B 5/0059; A61B 5/0088;
(Continued)

(56) References Cited

U.S. PATENT DOCUMENTS

| 6,014,239 A * | 1/2000 | Veligdan | H04B 10/114 381/172 |
|---|---|---|---|
| 8,823,775 B2 | 9/2014 | Xu et al. | |

(Continued)

FOREIGN PATENT DOCUMENTS

| CN | 105092014 A | * | 11/2015 | ............ G01H 9/00 |
|---|---|---|---|---|
| CN | 111045028 A | * | 4/2020 | |

OTHER PUBLICATIONS

Michael "Balanced Photo-Detector BPD", Physics Basel, SP 1'023, Electronic Lab 2.17, Klingelbergstr. 82, CH-4056 Basel, Switzerland, User's Manual, Rev 1.3, p. 5, April (Year: 2017).*

(Continued)

*Primary Examiner* — Leshui Zhang
(74) *Attorney, Agent, or Firm* — Brownstein Hyatt Farber Schreck, LLP

(57) ABSTRACT

An electronic device includes a microphone, an array of coherent optical emitters, an array of balanced coherent optical vibration sensors, and a processor. Each balanced coherent optical vibration sensor in the array of balanced coherent optical vibration sensors is paired with a coherent optical emitter in the array of coherent optical emitters. The processor is configured to analyze a set of waveforms acquired by the array of balanced coherent optical vibration sensors; identify, using the analysis of the set of waveforms, a set of one or more voices in a field of view; and adjust an output of the microphone to accentuate a particular voice in the set of one or more voices.

10 Claims, 10 Drawing Sheets

(51) Int. Cl.
*G01S 7/52* (2006.01)
*H04R 1/22* (2006.01)
*G01H 9/00* (2006.01)
*G10L 25/84* (2013.01)
*H04R 23/00* (2006.01)

(52) U.S. Cl.
CPC .......... *G01S 15/8993* (2013.01); *G10L 25/84* (2013.01); *H04R 1/222* (2013.01); *H04R 23/008* (2013.01)

(58) Field of Classification Search
CPC . A61B 5/02427; A61B 5/02416; A61B 5/024; A61B 3/113; A61N 5/0622
USPC ....... 704/226, 208, 231, 233, 235, 237, 239, 704/240, 243, 246, 247, 249, 250, 260; 381/56, 23.1, 26, 91, 92, 327, 312–321, 381/111, 112, 113, 114, 115, 122; 700/94
See application file for complete search history.

(56) References Cited

U.S. PATENT DOCUMENTS

| | | | |
|---|---|---|---|
| 8,824,706 B2 | 9/2014 | Stephanou et al. | |
| 9,741,344 B2 | 8/2017 | Bakish | |
| 10,824,275 B2 | 9/2020 | Mutlu et al. | |
| 11,029,442 B2 | 6/2021 | Mutlu et al. | |
| 11,473,898 B2 | 10/2022 | Mutlu et al. | |
| 2006/0074326 A1* | 4/2006 | Sebastian | A61B 5/1113 600/595 |
| 2012/0306823 A1* | 12/2012 | Pance | H04R 1/028 345/177 |
| 2017/0150254 A1* | 5/2017 | Bakish | H04R 23/02 |
| 2018/0233129 A1 | 8/2018 | Bakish et al. | |
| 2019/0090068 A1 | 3/2019 | Fishman et al. | |
| 2019/0110040 A1 | 4/2019 | Doyen et al. | |
| 2019/0253608 A1 | 8/2019 | Lee et al. | |
| 2021/0010797 A1 | 1/2021 | Cihan et al. | |
| 2022/0155052 A1 | 5/2022 | Mutlu et al. | |

OTHER PUBLICATIONS

U.S. Appl. No. 17/471,068, filed Sep. 9, 2021, Whitney et al.
Kwan et al., "Demosaicing of Bayer and CFA 2.0 Patters for Low Lighting Images," *Electronics*, 2019, vol. 8, No. 1444, pp. 1-58.
Nie et al., "Deeply Learned Filter Response Functions for Hyperspectral Reconstruction," 2018 IEEE/CVF Conference on Computer Vision and Pattern Recognition, Salt Lake City, Utah, 2018, pp. 4767-4776.
Paschotta, "Optical Heterodyne Detection," https:www.rp-photonics.com/optical_heterodyne_detection.html, known at least as early as Jul. 12, 2021, 8 pages.
Rogers et al., "A universal 3D imaging sensor on a silicon photonics platform," arXiv:2008.02411v3, physics.app-ph, Nov. 11, 2020, 18 pages.
Sun et al., "Large-scale nanophotonic phased array," *Nature*, vol. 493, Jan. 10, 2013, pp. 195-199.

* cited by examiner

DIRECTIONAL VOICE SENSING USING COHERENT OPTICAL DETECTION

FIELD

The described embodiments relate to vibrometry, voice sensing and, more particularly, to directional voice sensing using coherent optical detection.

BACKGROUND

Sensors are included in many of today's electronic devices, including electronic devices such as smartphones, computers (e.g., tablet computers or laptop computers), wearable electronic devices (e.g., electronic watches, smart watches, or health monitors), game controllers, navigation systems (e.g., vehicle navigation systems or robot navigation systems), and so on. Sensors may variously sense the presence of objects, distances to objects, proximities of objects, movements of objects (e.g., whether objects are moving, or the speed, acceleration, or direction of movement of objects), compositions of objects, and so on. One useful type of sensor is the optical sensor.

SUMMARY

Embodiments of the systems, devices, methods, and apparatus described in the present disclosure are directed to directional voice sensing using coherent optical detection.

In a first aspect, the present disclosure describes an electronic device. The electronic device may include a microphone, an array of coherent optical emitters, an array of balanced coherent optical vibration sensors, and a processor. Each balanced coherent optical vibration sensor in the array of balanced coherent optical vibration sensors may be paired with a coherent optical emitter in the array of coherent optical emitters. The processor may be configured to analyze a set of waveforms acquired by the array of balanced coherent optical vibration sensors; to identify, using the analysis of the set of waveforms, a set of one or more voices in a field of view; and to adjust an output of the microphone to accentuate a particular voice in the set of one or more voices.

In a second aspect, the present disclosure describes another electronic device. The electronic device may include one or an array of coherent optical emitters, an array of balanced coherent optical vibration sensors, and a processor. The processor may be configured to contemporaneously drive the coherent optical emitter or array of coherent optical emitters with a set of phase-shifted drive signals to focus a beam of light in a far field; to sequentially change the set of phase-shifted drive signals to steer the beam of light to different locations in the far field; to analyze a set of waveforms acquired by the array of balanced coherent optical vibration sensors, with the set of waveforms including different subsets of waveforms, and each subset of waveforms being acquired while the beam of light is focused on a particular location of the different locations; and to identify, using the analysis of the set of waveforms, a set of one or more voices in a field of view.

In a third aspect, the present disclosure describes another electronic device. The electronic device may include a coherent optical emitter, operable to emit a beam of light, and a balanced coherent optical vibration sensor. The balanced coherent optical vibration sensor may include an optical frequency shifter, an optical beam splitter configured to direct a first portion of the beam of light into a field of view and direct a second portion of the beam of light toward the optical frequency shifter, a local oscillator configured to interfere a reflected portion of the beam of light with the second portion of the beam of light, and a balanced optical detector positioned to receive balanced optical outputs from the local oscillator and generate a waveform indicative of a vibration of an object off which the first portion of the beam of light reflects.

In addition to the exemplary aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

Figure 1A:
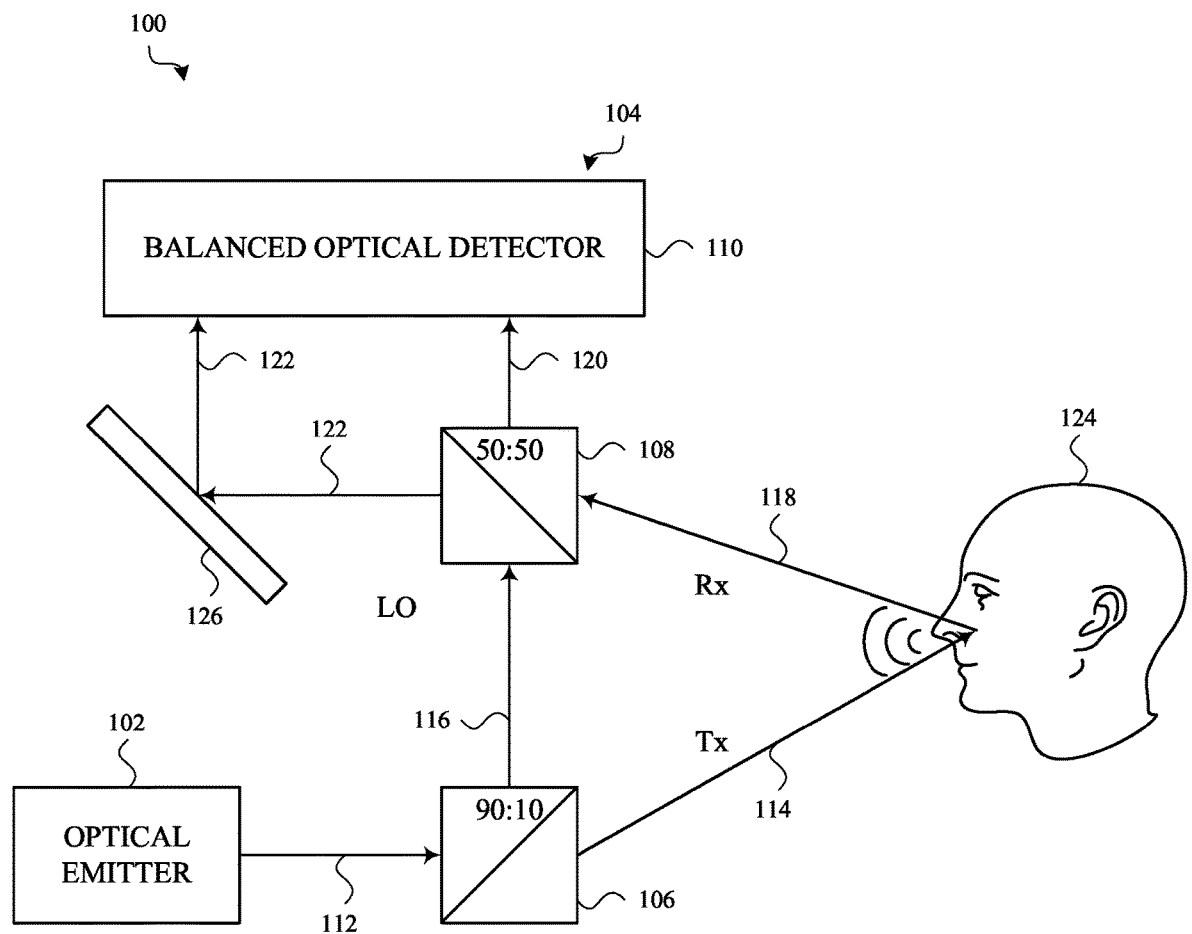
FIG. 1A shows a block diagram of an example device that includes a coherent optical emitter and a balanced coherent optical receiver operable as a vibration sensor.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof), and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

Described herein is a coherent optical emitter and a corresponding balanced coherent optical receiver operable as a vibration sensor or, in some cases, an array of coherent optical emitters and a corresponding array of balanced coherent optical receivers operable as vibration sensors. Collectively, these may be referred to as a coherent optical sensor. Such a coherent optical sensor may be used to detect audio vibrations (or voices) emitted from one or more audio vibration sources (or voice sources). The vibrations or voices may be detected in a directional manner. A problem with typical audio microphones is that they often have poor directionality of pickup due to the wavelength of the baseband acoustic signal (typically ~100 centimeters (cm)-meters (m)).

Using coherent optic sensing to detect audio vibrations (or voices) gives much better directionality. A coherent optical emitter (e.g., a laser) has low divergence. A small portion of the light emitted by a coherent optical emitter may be split to a local oscillator, and the rest of the emitted light may be passed to a target. A portion of the emitted light that reflects from the target may be modulated due to acoustic vibration at the target. An acoustic signal can be extracted from the reflected portion of the emitted light by interfering the reflected portion with the portion of the emitted light that is split to the local oscillator, and performing a balanced photodetection.

Described herein, in some embodiments, is a device that modulates (or frequency shifts) the portion of the emitted light that is split to the local oscillator. This enables better phase extraction for a received optical signal, which is sensitive to phase noise sources such as motion or low frequency mechanical vibration of the receiver. When modulating the local oscillator at a few 10 s of kilohertz (kHz), the low frequency phase noise can be easily removed.

Also described herein, in some embodiments, is an array of coherent optical sensors that enables collection of audio signals from multiple targets. This enables applications such as isolating one speaker from a multitude of simultaneous speakers, removing background noise, and so on.

Advantages of a coherent optical sensor over other types of sensors (e.g., speckle imaging sensors and self-mixing interference (SMI) sensors) is that the local oscillator serves as an amplifier for the reflected portion of the emitted light, which overcomes detector shot noise and improves dynamic range.

The above and other embodiments and techniques are described with reference to FIGS. 1-8. However, those skilled in the art will readily appreciate that the detailed description given herein with respect to these figures is for explanatory purposes only and should not be construed as limiting.

Directional terminology, such as "top", "bottom", "upper", "lower", "front", "back", "over", "under", "above", "below", "left", "right", etc. is used with reference to the orientation of some of the components in some of the figures described below. Because components in various embodiments can be positioned in a number of different orientations, directional terminology is used for purposes of defining relative positions of various structures, and not absolute positions. For example, a first structure described as being "above" a second structure and "below" a third structure is also "between" the second and third structures, and would be "above" the third structure and "below" the second structure if the stack of structures were to be flipped. Also, as used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

In the embodiments described below, the term "vibration sensor" is used to refer to a "balanced coherent optical receiver" that is operable as a vibration sensor.

Figure 1B:
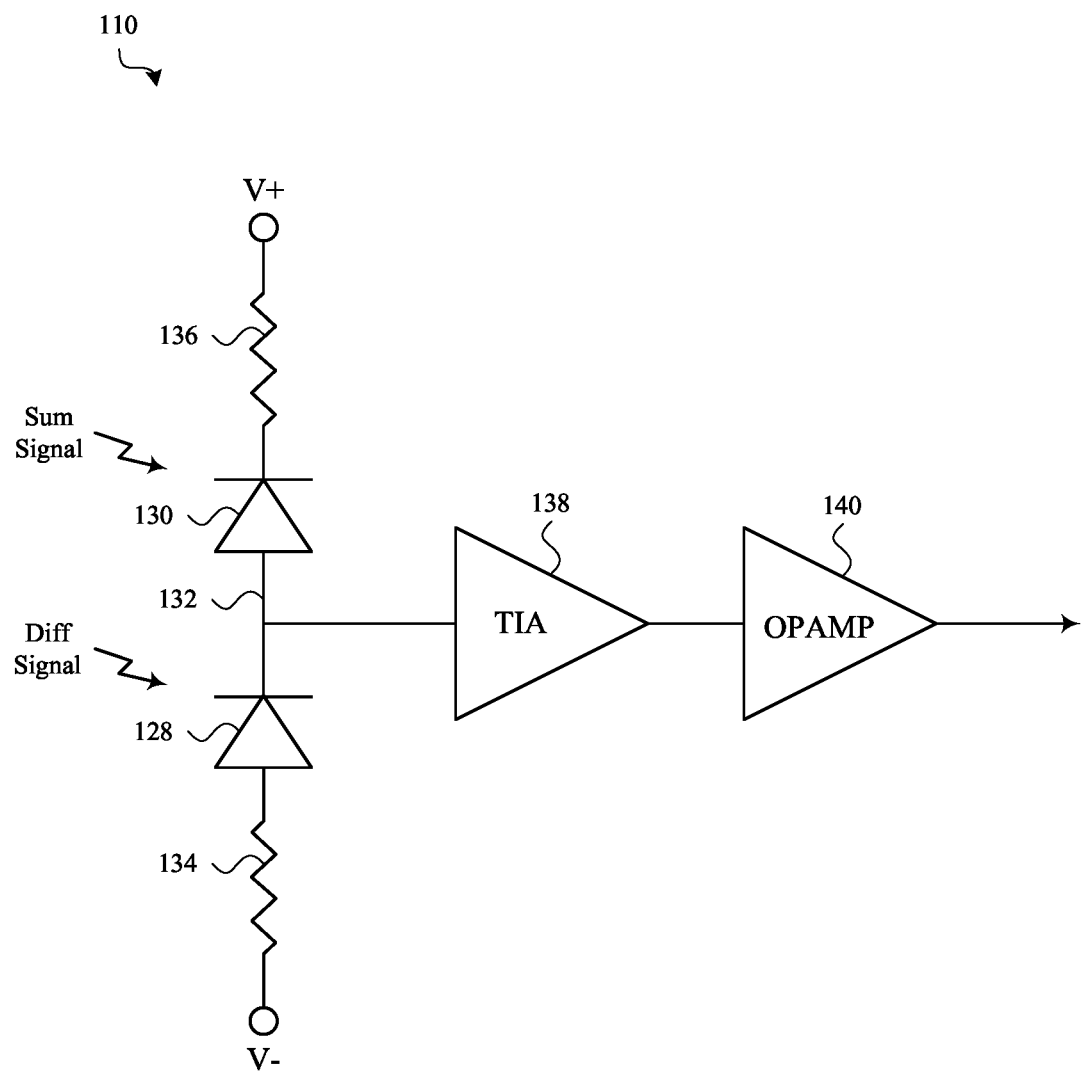
FIG. 1B shows an example schematic of the balanced optical detector shown in FIG. 1A.

FIGS. 1A and 1B show an example device 100 including a coherent optical emitter 102 and a balanced coherent optical vibration sensor 104. The balanced coherent optical vibration sensor 104 may include an optical beam splitter 106, a local oscillator (LO) 108, and a balanced optical detector 110.

As shown in FIG. 1A, the coherent optical emitter 102 may emit a beam of light 112. The beam of light 112 may be received by the optical beam splitter 106. The optical beam splitter 106 may be configured to direct a first portion (or transmitted (Tx) portion) 114 of the beam of light 112 into a field of view and direct a second portion 116 of the beam of light 112 toward the local oscillator 108. By way of example, the optical beam splitter 106 is shown to have a 90:10 ratio, such that 90% of the beam of light 112 may be included in the first portion 114 of the beam of light 112 and 10% of the beam of light 112 may be included in the second portion 116 of the beam of light 112. In other embodiments, the optical beam splitter 106 may direct different amounts of the beam of light 112 into the field of view or toward the local oscillator 108.

The local oscillator 108 may be configured to interfere a reflected portion (or received (Rx) portion) 118 of the beam of light 112 with the second portion 116 of the beam of light 112 and direct a sum of the interfered light (i.e., a first output 120) toward a first input of the balanced optical detector 110. The local oscillator 108 may direct a difference of the interfered light (e.g., a second output 122) toward a second input of the balanced optical detector 110. The balanced optical detector 110 may be positioned to receive the balanced optical outputs 120, 122 from the local oscillator 108 and generate a waveform indicative of a vibration of an object 124 off which the first portion 114 of the beam of light 112 reflects. In some cases, the first or second output 120, 122 of the local oscillator 108 may be redirected by a mirror 126, so that the inputs to the balanced optical detector 110 may be positioned adjacent one another on a common substrate.

FIG. 1B shows an example embodiment of the balanced optical detector 110. The balanced optical detector 110 may include first and second photodiodes 128, 130 that respectively receive the first and second outputs 120, 122 (optical outputs) of the local oscillator 108. The first photodiode 128 may be reverse-biased between a low voltage node (e.g., V−) and an output node 132, and in some cases may be coupled in series with a resistor 134. The second photodiode 130 may be reverse-biased between the output node 132 and a high voltage node (e.g., V+), and in some cases may be coupled in series with a resistor 136. The output node 132 may be coupled to an input of a transimpedance amplifier (TIA) 138, and the TIA 138 may have an output coupled to one or more additional amplifiers, which is/are generally represented by the operational amplifier (OPAMP) 140. A waveform (e.g., a current waveform) output from the amplifier 140 may be processed (e.g., using a Hilbert transform)

to extract a variation in phase over time and, ultimately, an audio waveform. The Hilbert transform may be applied by a processor in an analog domain or, the waveform output from the amplifier 140 may be digitized, and the Hilbert transform may be applied by a processor in a digital domain. The audio waveform may also be extracted, by a processor, in a digital domain.

The coherent optical emitter 102 may include, for example, a vertical-cavity surface-emitting laser (VCSEL), a vertical external-cavity surface-emitting laser (VECSEL), a quantum-dot laser (QDL), a quantum cascade laser (QCL), or any other coherent light source.

Mathematically, the first output 120 may be a sum (Sum Signal) of the intensities of light of the second portion 116 and the reflected portion 118 of the emitted light 112, and the second output 122 may be a difference (Diff Signal) of the intensities of light of the second portion 116 and the reflected portion 118 of the emitted light 112. The balanced optical detector 110 may subtract the second output 122 from the first output 120, which removes common mode noise contained in the second portion 116 of the emitted light 112 and amplifies the reflected portion 118 of the emitted light 112.

Figure 2:
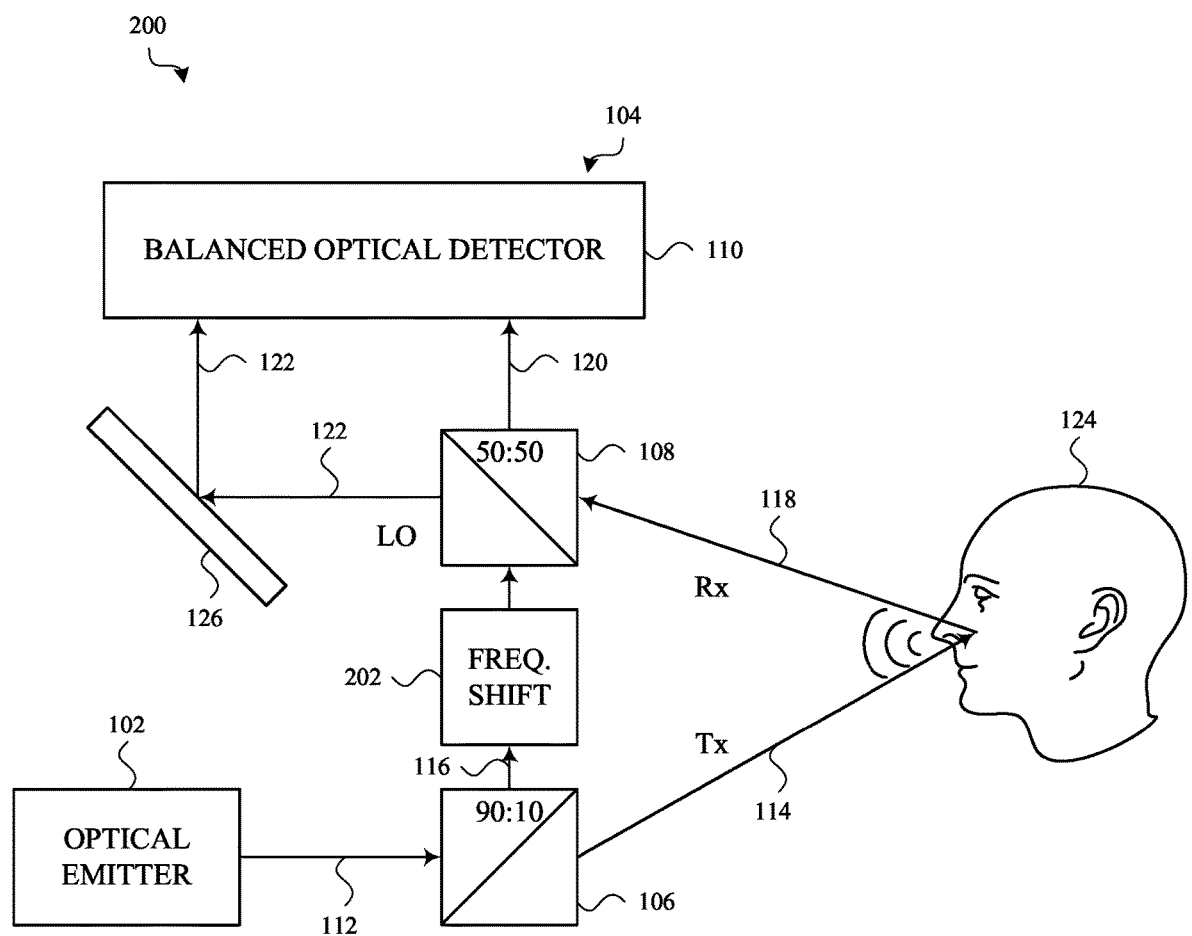
FIG. 2 shows a variation of the device described with reference to FIGS. 1A and 1B.

FIG. 2 shows a variation of the device described with reference to FIGS. 1A and 1B. The device 200 differs from the device described with reference to FIGS. 1A and 1B in that it includes an optical frequency shifter 202. The optical frequency shifter 202 may shift a frequency of the second portion 116 of the beam of light 112, before the second portion 116 of the beam of light 112 is interfered with the reflected portion 118 of the beam of light 112. Shifting the frequency of the second portion 116 of the beam of light 112 may move the "interference" that occurs within the local oscillator 108 to a frequency that is less susceptible to interference from noise. In some cases, the optical frequency shifter 202 may shift the frequency of the second portion 116 of the beam of light 112 from 10-20 kilohertz (kHz). In some embodiments, the optical frequency shifter 202 may be an electro-optic phase modulator, an acousto-optic phase modulator, a thermo-optic phase modulator, or any other type of phase modulator.

In some embodiments, some or all of the components of the device 100 or 200 described with reference to FIG. 1A-1B or 2 may be provided using silicon photonics (e.g., a photonic integrated circuit (PIC) including one or more of silicon nitride, silicon oxide, III-V semiconductors, and so on). For example, in some embodiments, the optical beam splitter 106, local oscillator 108, and/or optical frequency shifter 202 may be provided using silicon photonics. In some embodiments, silicon photonics may be implemented on a first substrate, and the coherent optical emitter 102 may be formed on a second substrate that is stacked with and joined to the first substrate. In some embodiments, the transistors and other electrical components of the balanced optical detector 110, a drive circuit for the coherent optical emitter 102, and/or other electrical components may be formed in a backplane of the coherent optical emitter 102, on the first substrate with the silicon photonics, and/or on a third substrate that is stacked with and joined to the second substrate. In some embodiments, the photodiodes may be germanium photodiodes. The germanium photodiodes may in some cases be formed on (or attached to) the first substrate on which the silicon photonics are implemented.

Figure 3:
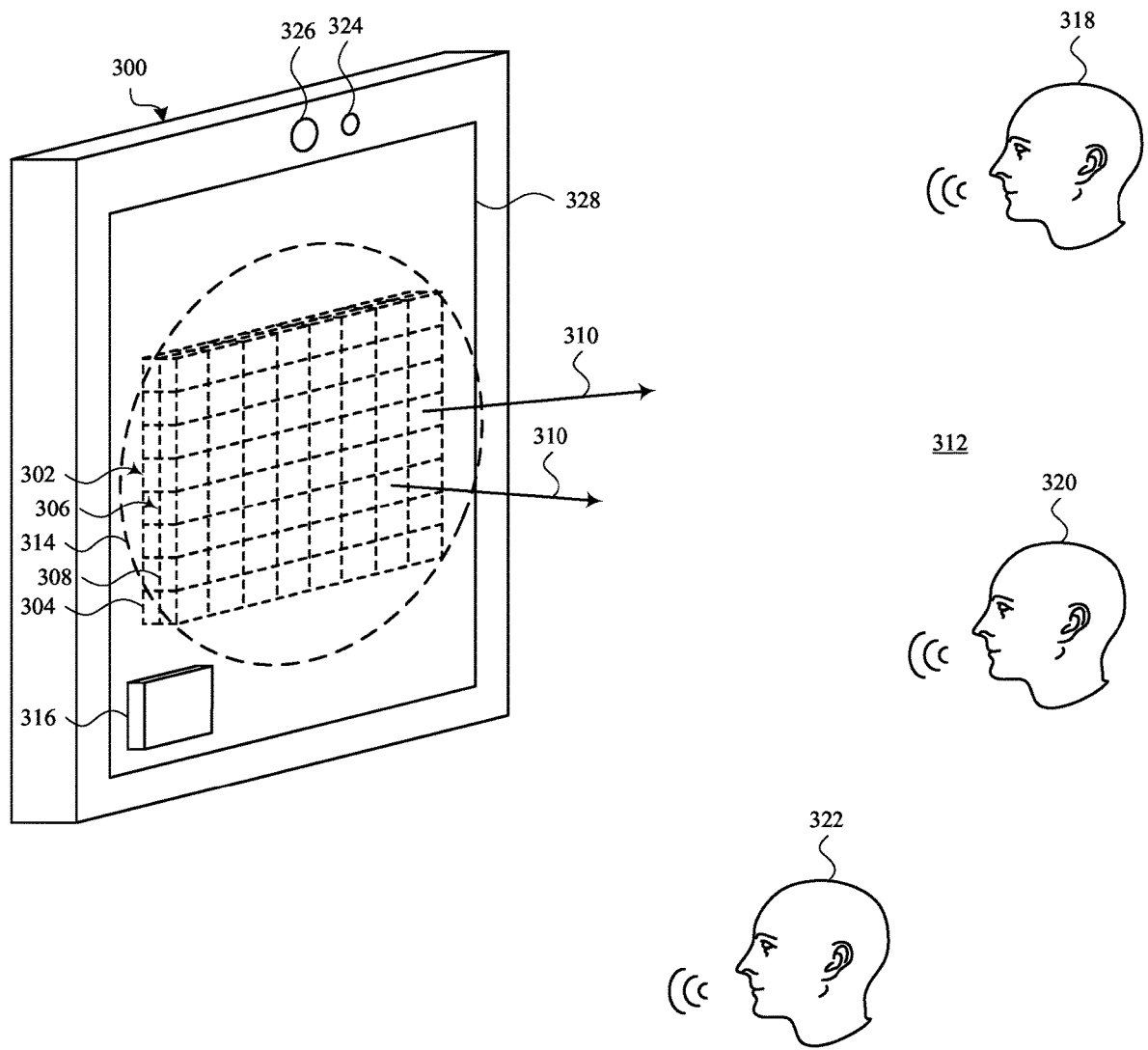
FIGS. 3-7B show various examples of devices that may include an array of coherent optical emitters and an array of balanced coherent optical receivers operable as vibration sensors.

FIG. 3 shows an example device 300 including an array 302 of coherent optical emitters 304 and an array 306 of balanced coherent optical vibration sensors 308. Each optical vibration sensor 308 in the array 306 may be paired with an optical emitter 304 in the array 302.

By way of example, the arrays 302, 306 are shown to be stacked, with the array 302 of optical emitters 304 being positioned to emit beams of light through the array 306 of optical vibration sensors 308. Alternatively, the arrays 302, 306 may be formed side-by-side and include interspersed optical emitters 304 and optical vibration sensors 308.

Each of the coherent optical emitters 304 may be constructed as described with reference to FIG. 1A-1B or 2. Each of the balanced coherent optical vibration sensors 308 may also be constructed as described with reference to FIG. 1A-1B or 2.

Figure 4:
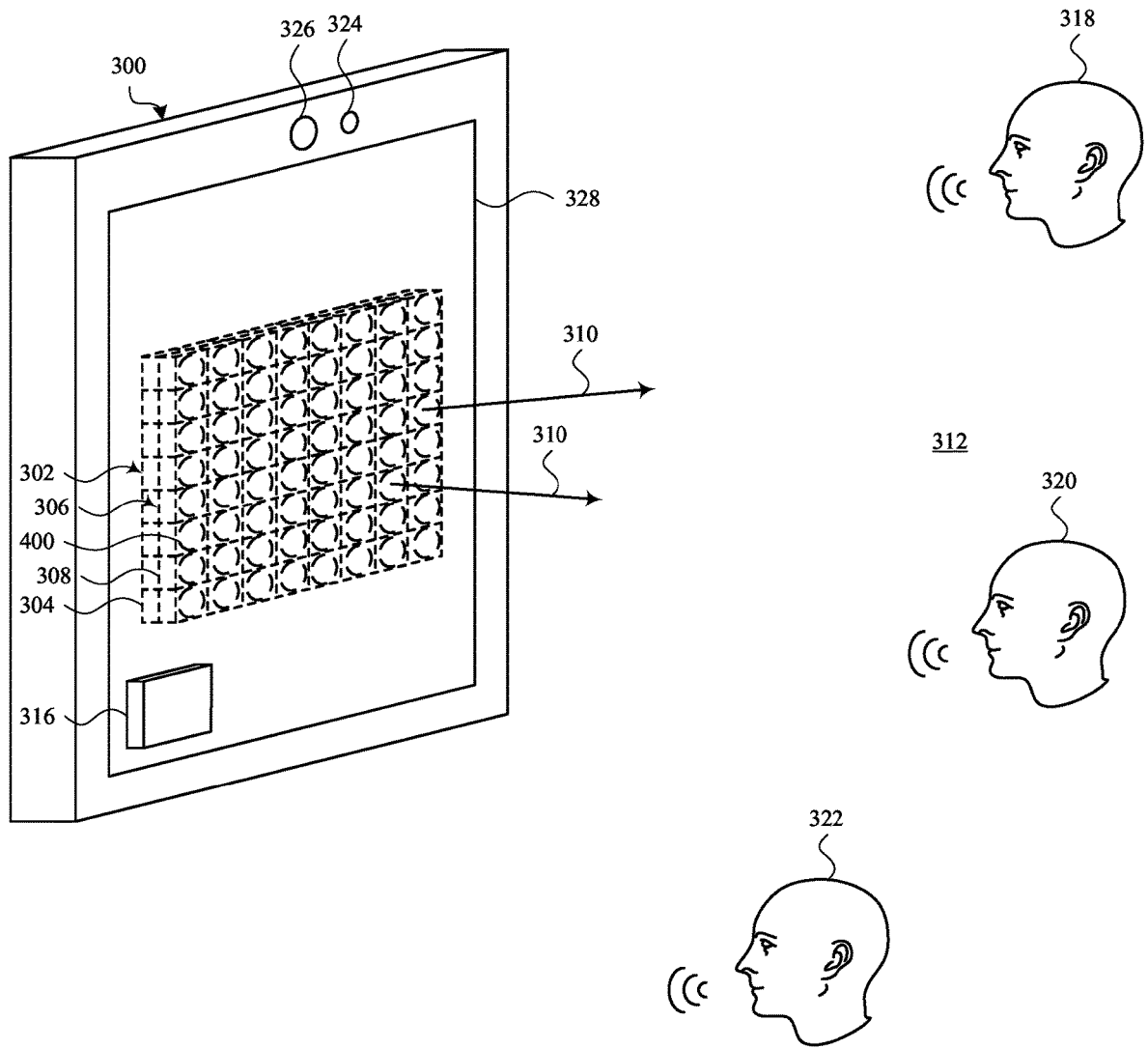

Each of the optical emitters 304 may emit a respective beam of light 310 into a field of view 312. Each beam of light may have a rather small divergence. In some cases, each beam of light may travel a few or several meters with minimal divergence. Each beam of light may impinge on a different portion of a far field target, or on different objects in a far field (e.g., some number of decimeters or meters from the device 300). In some cases, at least one lens may be positioned to direct the beams of light 310 emitted by the optical emitters 304 in different directions. As shown in FIG. 3, the at least one lens may include a lens 314 (or multiple lenses) that receive all of the beams of light 310 and directs the beams of light 310 in different directions. Alternatively, and as shown in FIG. 4, the at least one lens may include an array of lenses, in which different lenses 400 in the array receive different beams of light 310 emitted by different optical emitters 304 and direct the different beams of light 310 in different directions.

Each of the optical vibration sensors 308 may produce a respective waveform, which waveform may in some cases be a current waveform. A processor 316 may receive the current waveforms generated by the optical vibration sensors 308, and may generate, for each optical vibration sensor 308, a waveform indicating a variation in phase of the current waveform over time and/or an audio waveform. The processor 316 may include analog processing components and/or digital processing components, and in some cases may be implemented, at least partly, using one or more of a microprocessor, an application-specific integrated circuit (ASIC), and so on.

The processor 316 may be configured to analyze a set of waveforms acquired by the array 306 of optical vibration sensors 308 and identify, using the analysis of the set of waveforms, a set of one or more voices in the field of view 312. By way of example, FIG. 3 shows three people, representing three voice sources 318, 320, 322. In some cases, the processor 316 may identify three voices, corresponding to the three people (or three voice sources 318, 320, 322), by detecting voices in the raw or processed waveforms generated by, or derived from, the optical vibration sensors 308 in the array 306 of optical vibration sensors 308. The voices may be detected based on vibrations of the people's skin, mouths, teeth, glasses, throats, clothes, or other surfaces that may vibrate when the people use their voices.

In some embodiments, the device 300 may include a microphone 324, and the processor 316 may be configured to adjust an output of the microphone 324. In some cases, the processor 316 may adjust the output of the microphone 324 to accentuate or de-accentuate a particular voice in the set of one or more voices. For purposes of this description, the microphone 324 may be a microphone capable of sensing acoustic waveforms, any type of vibration sensor, an image sensor capable of acquiring images from which speech or other sounds may be derived, and so on.

In some embodiments, the processor 316 may adjust the output of the microphone 324 by amplifying or filtering a particular frequency in the output of the microphone 324. In some embodiments, the processor 316 may adjust the output of the microphone 324 by filtering, from the output of the microphone, vibrations appearing in the set of waveforms that are not associated with a particular voice (e.g., the processor 316 may filter out background noise). In some embodiments, the microphone 324 may be a directional microphone, and the processor 316 may adjust the output of the microphone 324 by adjusting a directionality of the directional microphone.

In some embodiments, the device 300 may include a camera 326. The camera 326 may be positioned to capture an image that at least partially overlaps the field of view 312. In these embodiments, the processor 316 may be configured to identify the set of one or more voice sources 318, 320, 322 in the image (e.g., using one or more of pattern recognition, artificial intelligence, and so on). The processor 316 may then map the set of one or more voices to the set of one or more voice sources 318, 320, 322. In some cases, the processor 316 may map the set of one or more voices to the set of one or more voice sources 318, 320, 322 using the following algorithm. The algorithm includes determining, based at least partly on the image, a first direction to a voice source in the set of one or more voice sources 318, 320, 322. The algorithm further includes determining, based at least partly on a subset of waveforms that include a voice in the set of one or more voices, and based at least partly on a directionality of a subset of balanced coherent optical vibration sensors 308 that generated the subset of waveforms, a second direction to the voice. The first direction may then be correlated with the second direction to map the voice to the voice source.

Figure 6:
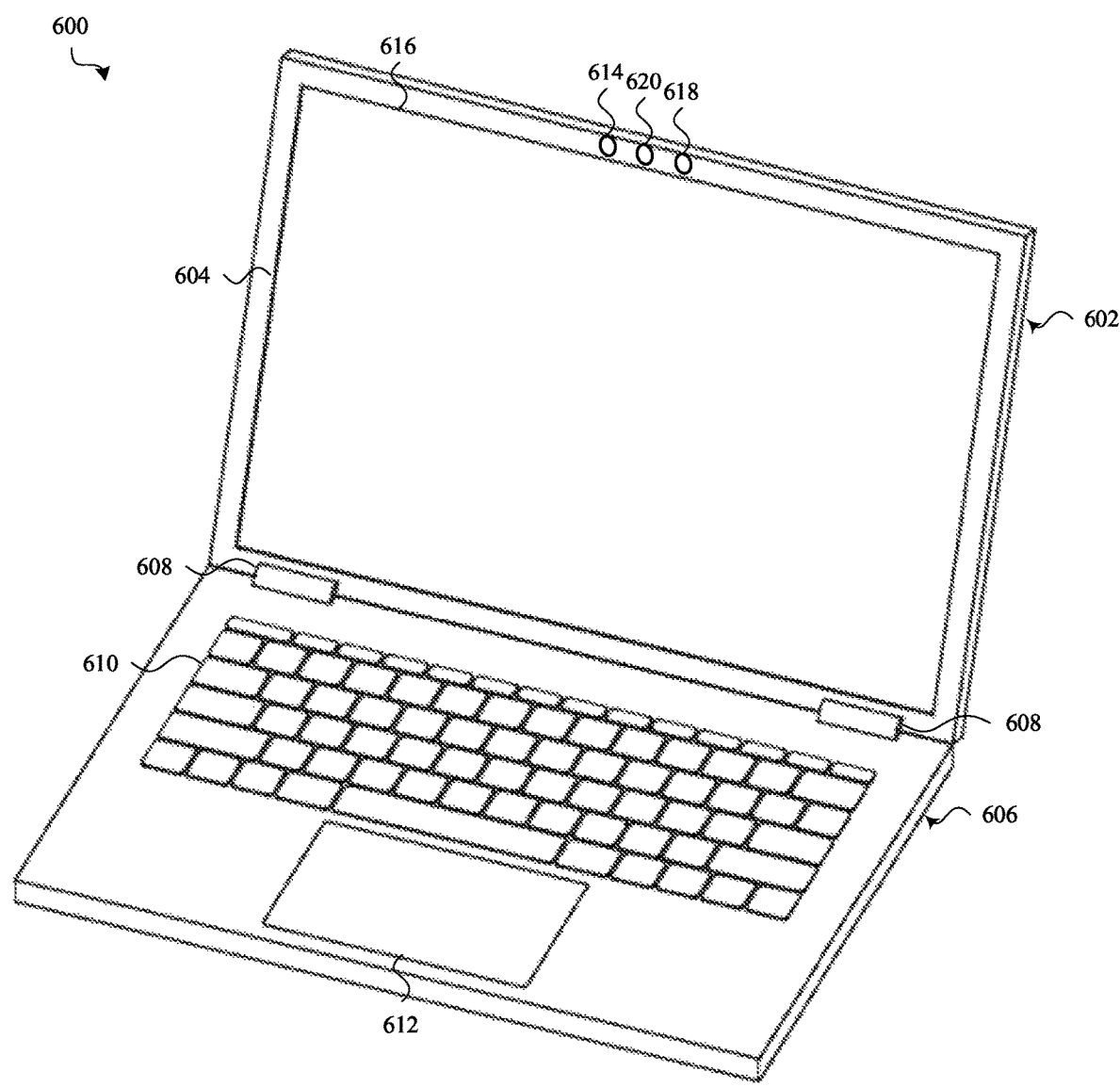

In some embodiments, the device 300 may include a display 328. As shown in FIGS. 3 and 4, the array 302 of optical emitters 304 and array 306 of optical vibration sensors 308 may be positioned behind the display 328. Such an embodiment may be useful, for example, in a smartphone. If the optical emitters 304 emit long wavelengths and the optical vibration sensors 308 detect the same long wavelengths, the long wavelengths (e.g., on the order of one micron) may pass through the display 328 without affecting, or being affected by, the display 328. Alternatively, and as shown in FIG. 6, an array of optical emitters and an array of optical vibration sensors may be positioned outside and adjacent an edge of a display. Such an embodiment may be useful, for example, in a laptop computer.

Figure 5:
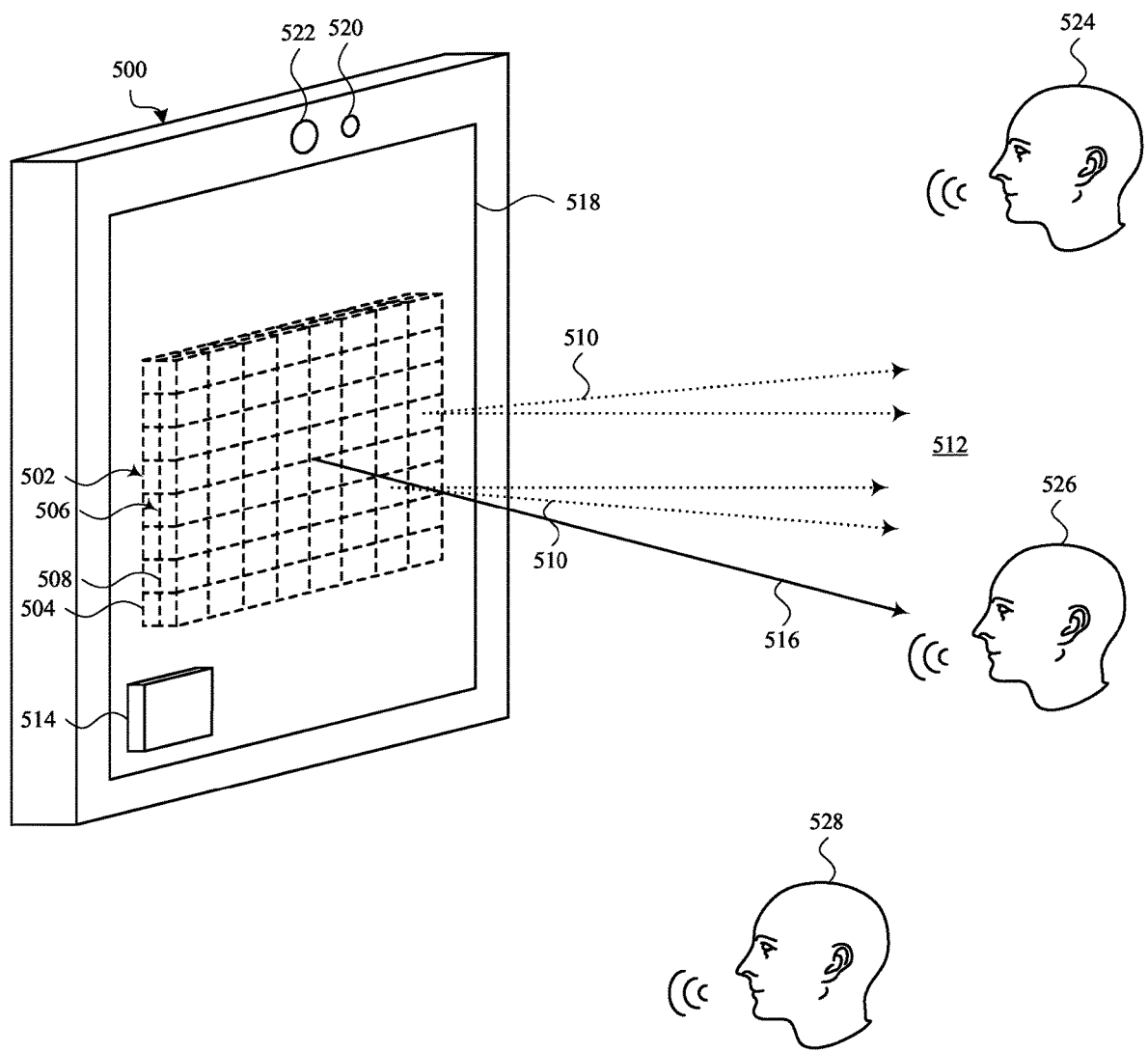

FIG. 5 shows an example device 500 including an array 502 of coherent optical emitters 504 and an array 506 of balanced coherent optical vibration sensors 508. Each optical vibration sensor 508 in the array 506 may be paired with an optical emitter 504 in the array 502.

By way of example, the arrays 502, 506 are shown to be stacked, with the array 502 of optical emitters 504 being positioned to emit beams of light through the array 506 of optical vibration sensors 508. Alternatively, the arrays 502, 506 may be formed side-by-side and include interspersed optical emitters 504 and optical vibration sensors 508.

Each of the coherent optical emitters 504 may be constructed as described with reference to FIG. 1A-1B or 2. Each of the balanced coherent optical vibration sensors 508 may also be constructed as described with reference to FIG. 1A-1B or 2.

Each of the optical emitters 504 may emit a respective beam of light 510 into a field of view 512. Each beam of light 510 may diverge, and the beams of light 510 may overlap in a far field (e.g., some number of decimeters or meters from the device 500.

Each of the optical vibration sensors 508 may produce a respective waveform, which waveform may in some cases be a current waveform. A processor 514 may receive the current waveforms generated by the optical vibration sensors 508, and may generate, for each optical vibration sensor 508, a waveform indicating a variation in phase of the current waveform over time and/or an audio waveform. The processor 514 may include analog processing components and/or digital processing components, and in some cases may be implemented, at least partly, using one or more of a microprocessor, an ASIC, and so on.

The processor 514 may be configured to contemporaneously drive the array 502 of optical emitters 504 with a set of phase-shifted drive signals to focus a beam of light 516 in a far field. In other words, the processor 514 may operate the array 502 of optical emitters 504 as a phased optical array and focus the beam of light 516 through constructive and destructive interference between the beams of light 510.

The processor 514 may sequentially change the set of phase-shifted drive signals to steer the beam of light 516 to different locations in the far field. In some cases, the processor 514 may cause the beam of light 516 to be scanned across a field of view. In some cases, the processor 514 may cause the beam of light 516 to jump from location to location in the field of view.

The processor 514 may be further configured to analyze a set of waveforms acquired by the array 506 of optical vibration sensors 508. The set of waveforms may include different subsets of waveforms. Each subset of waveforms may be acquired while the beam of light 516 is focused on a particular location.

The processor 514 may also be configured to identify, using the analysis of the set of waveforms, a set of one or more voices in a field of view 512.

In some embodiments, the device 500 may include a microphone 520, and the processor 514 may be configured to adjust an output of the microphone 520. In some cases, the processor 514 may adjust the output of the microphone 520 to accentuate or de-accentuate a particular voice in the set of one or more voices. The output of the microphone 520 may be adjusted as described with reference to FIG. 3. For purposes of this description, the microphone 520 may be a microphone capable of sensing acoustic waveforms, any type of vibration sensor, an image sensor capable of acquiring images from which speech or other sounds may be derived, and so on.

In some embodiments, the device 500 may include a camera 522. The camera 522 may be positioned to capture an image that at least partially overlaps the field of view 512. In these embodiments, the processor 514 may be configured to identify a set of one or more voice sources 524, 526, 528 in the image (e.g., using one or more of pattern recognition, artificial intelligence, and so on). The processor 514 may then map the set of one or more voices to the set of one or more voice sources 524, 526, 528 as described with reference to FIG. 3. Additionally or alternatively, the processor 514 may be configured to steer the beam of light 516 toward at least one voice source in the set of one or more voice sources 524, 526, 528.

In some embodiments, the device 500 may include a display 518. As shown in FIG. 5, the array 502 of optical emitters 504 and array 506 of optical vibration sensors 508 may be positioned behind the display 518. Such an embodiment may be useful, for example, in a smartphone. Alternatively, and as shown in FIG. 6, an array of optical emitters and an array of optical vibration sensors may be positioned outside and adjacent an edge of a display. Such an embodiment may be useful, for example, in a laptop computer.

FIG. 6 shows a first example of an electronic device 600 in which an array of coherent optical emitters and a corresponding array of balanced coherent optical vibration sensors may be incorporated. In some cases, a microphone and/or camera may also be incorporated into the device 600.

The device 600 may include an upper enclosure 602 housing a display 604. A lower enclosure 606 may be pivotally coupled to the upper enclosure 602 via one or more hinges 608. The lower enclosure 606 may house a keyboard 610 and a trackpad 612. The keyboard 610 may include an electromechanical keyboard, a virtual keyboard, or another type of keyboard component/device configured to receive keystrokes from the user. The trackpad 612 may be an electromechanical trackpad, an electronic trackpad, or a virtual trackpad, or may be replaced by (or supplemented with) another type of device configured to receive touch and/or force input from a user (e.g., a trackball or pointing stick).

An array of coherent optical emitters and an array of balanced coherent optical vibration sensors, collectively designated 614, may be included in the upper enclosure 602 and, in some embodiments, may be positioned outside and adjacent an edge 616 (e.g., an upper edge) of the display 604. Alternatively, the optical emitters and optical vibration sensors 614 may be positioned in front of or behind, or interspersed with, the light-emitting elements of the display 604. The optical emitters and optical vibration sensors 614 may be used to detect one or more voices, or to locate one or more voice sources, or may serve as a biometric sensor (e.g., a voice recognition sensor), a camera, a depth sensor, and so on. The array of optical emitters and optical vibration sensors 614 may also function as a proximity sensor, for determining whether an object (e.g., a face, finger, or stylus) is proximate to the upper enclosure 602 (e.g., the presence of an object may be determined by its vibrations, and in some cases may be identified by its vibrations).

In some embodiments, the device 600 may include a microphone 618 and/or camera 620. As an example, a microphone 618 and a camera 620 are shown to be housed within the upper enclosure 602, adjacent the array of optical emitters and optical vibration sensors 614. In alternative embodiments, the array of optical emitters and optical vibration sensors 614 and/or microphone 618 may be housed by the lower enclosure 606 (e.g., between the keyboard 610 and a back edge of the lower enclosure 606). The microphone 618 and/or camera 620 may be used separately, or in conjunction with the array of optical emitters and optical vibration sensors 614 (e.g., as described with reference to FIGS. 3-5).

Figure 7A:
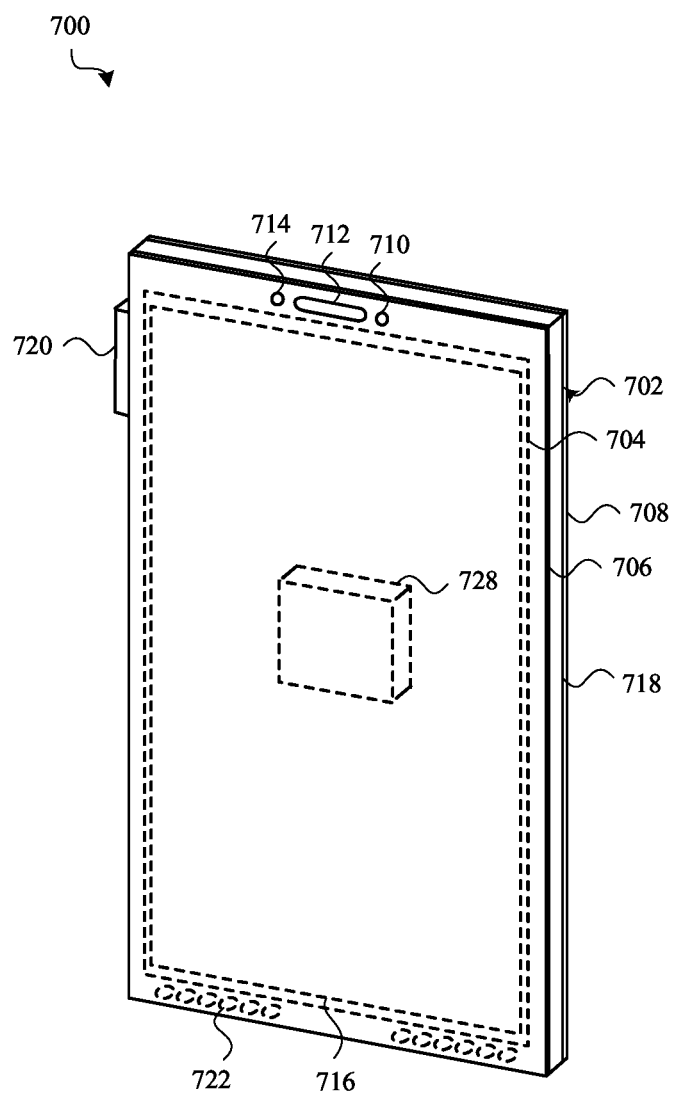
Figure 7B:
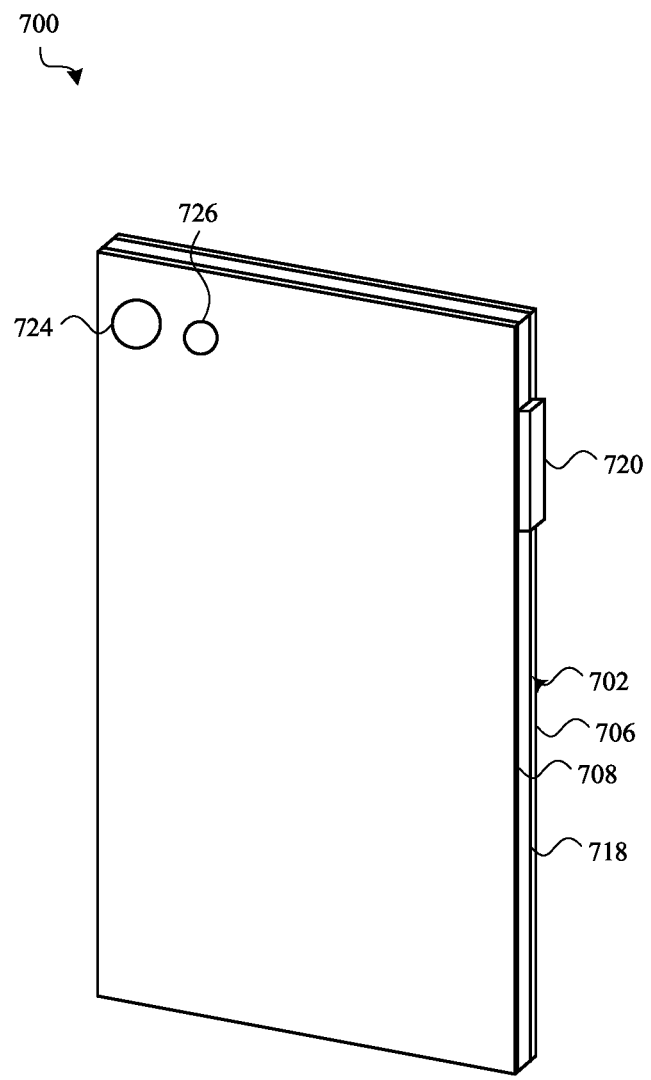

FIGS. 7A and 7B show another example of a device in which an array of coherent optical emitters and a corresponding array of balanced coherent optical vibration sensors may be incorporated. The device's dimensions and form factor, including the ratio of the length of its long sides to the length of its short sides, suggest that the device 700 is a mobile phone (e.g., a smartphone). However, the device's dimensions and form factor are arbitrarily chosen, and the device 700 could alternatively be any portable electronic device including, for example a mobile phone, tablet computer, portable computer, portable music player, electronic watch, health monitoring device, portable terminal, vehicle navigation system, robot navigation system, or other portable or mobile device. The device 700 could also be a device that is semi-permanently located (or installed) at a single location (e.g., a door lock, thermostat, refrigerator, or other appliance). FIG. 7A shows a front isometric view of the device 700, and FIG. 7B shows a rear isometric view of the device 700. The device 700 may include a housing 702 that at least partially surrounds a display 704. The housing 702 may include or support a front cover 706 or a rear cover 708. The front cover 706 may be positioned over the display 704, and may provide a window through which the display 704 (including images displayed thereon) may be viewed by a user. In some embodiments, the display 704 may be attached to (or abut) the housing 702 and/or the front cover 706.

The display 704 may include one or more light-emitting elements or pixels, and in some cases may be an LED display, an OLED display, a liquid crystal display (LCD), an electroluminescent (EL) display, a laser projector, or another type of electronic display. In some embodiments, the display 704 may include, or be associated with, one or more touch and/or force sensors that are configured to detect a touch and/or a force applied to a surface of the front cover 706.

The various components of the housing 702 may be formed from the same or different materials. For example, a sidewall 718 of the housing 702 may be formed using one or more metals (e.g., stainless steel), polymers (e.g., plastics), ceramics, or composites (e.g., carbon fiber). In some cases, the sidewall 718 may be a multi-segment sidewall including a set of antennas. The antennas may form structural components of the sidewall 718. The antennas may be structurally coupled (to one another or to other components) and electrically isolated (from each other or from other components) by one or more non-conductive segments of the sidewall 718. The front cover 706 may be formed, for example, using one or more of glass, a crystal (e.g., sapphire), or a transparent polymer (e.g., plastic) that enables a user to view the display 704 through the front cover 706. In some cases, a portion of the front cover 706 (e.g., a perimeter portion of the front cover 706) may be coated with an opaque ink to obscure components included within the housing 702. The rear cover 708 may be formed using the same material(s) that are used to form the sidewall 718 or the front cover 706, or may be formed using a different material or materials. In some cases, the rear cover 708 may be part of a monolithic element that also forms the sidewall 718 (or in cases where the sidewall 718 is a multi-segment sidewall, those portions of the sidewall 718 that are non-conductive). In still other embodiments, all of the exterior components of the housing 702 may be formed from a transparent material, and components within the device 700 may or may not be obscured by an opaque ink or opaque structure within the housing 702.

The front cover 706 may be mounted to the sidewall 718 to cover an opening defined by the sidewall 718 (i.e., an opening into an interior volume in which various electronic components of the device 700, including the display 704, may be positioned). The front cover 706 may be mounted to the sidewall 718 using fasteners, adhesives, seals, gaskets, or other components.

A display stack or device stack (hereafter referred to as a "stack") including the display 704 (and in some cases the front cover 706) may be attached (or abutted) to an interior surface of the front cover 706 and extend into the interior volume of the device 700. In some cases, the stack may also include a touch sensor (e.g., a grid of capacitive, resistive, strain-based, ultrasonic, or other type of touch sensing elements), or other layers of optical, mechanical, electrical, or other types of components. In some cases, the touch sensor (or part of a touch sensor system) may be configured to detect a touch applied to an outer surface of the front cover 706 (e.g., to a display surface of the device 700).

The stack may also include an array of coherent optical emitters and an array of balanced coherent optical vibration sensors, collectively designated 716. The optical emitters and optical vibration sensors 716 may be positioned in front of or behind, or interspersed with, the light-emitting elements of the display 704. The optical emitters and optical vibration sensors 716 may extend across an area equal in size to the area of the display 704. Alternatively, the optical emitters and optical vibration sensors 716 may extend across an area that is smaller than or greater than the area of the display 704. Although the optical emitters and optical vibration sensors 716 are shown to have a rectangular boundary, the optical emitters and optical vibration sensors 716 could alternatively have a boundary with a different shape, including, for example, an irregular shape. The optical emitters and optical vibration sensors 716 may be used to detect one or more voices, or to locate one or more voice sources, or may serve as a biometric sensor (e.g., a voice recognition sensor), a camera, a depth sensor, and so on. The array of optical emitters and optical vibration sensors 716 may also function as a proximity sensor, for determining whether an object (e.g., a face, finger, or stylus) is proximate to the front cover 706 (e.g., the presence of an object may be determined by its vibrations, and in some cases may be identified by its vibrations).

In some cases, a force sensor (or part of a force sensor system) may be positioned within the interior volume below and/or to the side of the display 704 (and in some cases within the stack). The force sensor (or force sensor system) may be triggered in response to the touch sensor detecting one or more touches on the front cover 706 (or indicating a location or locations of one or more touches on the front cover 706), and may determine an amount of force associated with each touch, or an amount of force associated with the collection of touches as a whole.

As shown primarily in FIG. 7A, the device 700 may include various other components. For example, the front of the device 700 may include one or more front-facing cameras 710 (including one or more image sensors), speakers 712, microphones 714, or other components (e.g., audio, imaging, and/or sensing components) that are configured to transmit or receive signals to/from the device 700. In some cases, a front-facing camera 710, alone or in combination with other sensors, may be configured to operate as a bio-authentication or facial recognition sensor. The microphone 714 and/or front-facing camera 710 may be used separately, or in conjunction with the array of optical emitters and optical vibration sensors 716 (e.g., as described with reference to FIGS. 3-5).

The device 700 may also include buttons or other input devices positioned along the sidewall 718 and/or on a rear surface of the device 700. For example, a volume button or multipurpose button 720 may be positioned along the sidewall 718, and in some cases may extend through an aperture in the sidewall 718. The sidewall 718 may include one or more ports 722 that allow air, but not liquids, to flow into and out of the device 700. In some embodiments, one or more sensors may be positioned in or near the port(s) 722. For example, an ambient pressure sensor, ambient temperature sensor, internal/external differential pressure sensor, gas sensor, particulate matter concentration sensor, or air quality sensor may be positioned in or near a port 722.

In some embodiments, the rear surface of the device 700 may include a rear-facing camera 724. A flash or light source 726 may also be positioned along the rear of the device 700 (e.g., near the rear-facing camera). In some cases, the rear surface of the device 700 may include multiple rear-facing cameras.

A processor 728 may receive and process signals and information received from the device's sensors and/or control other functions of the device 700.

Figure 8:
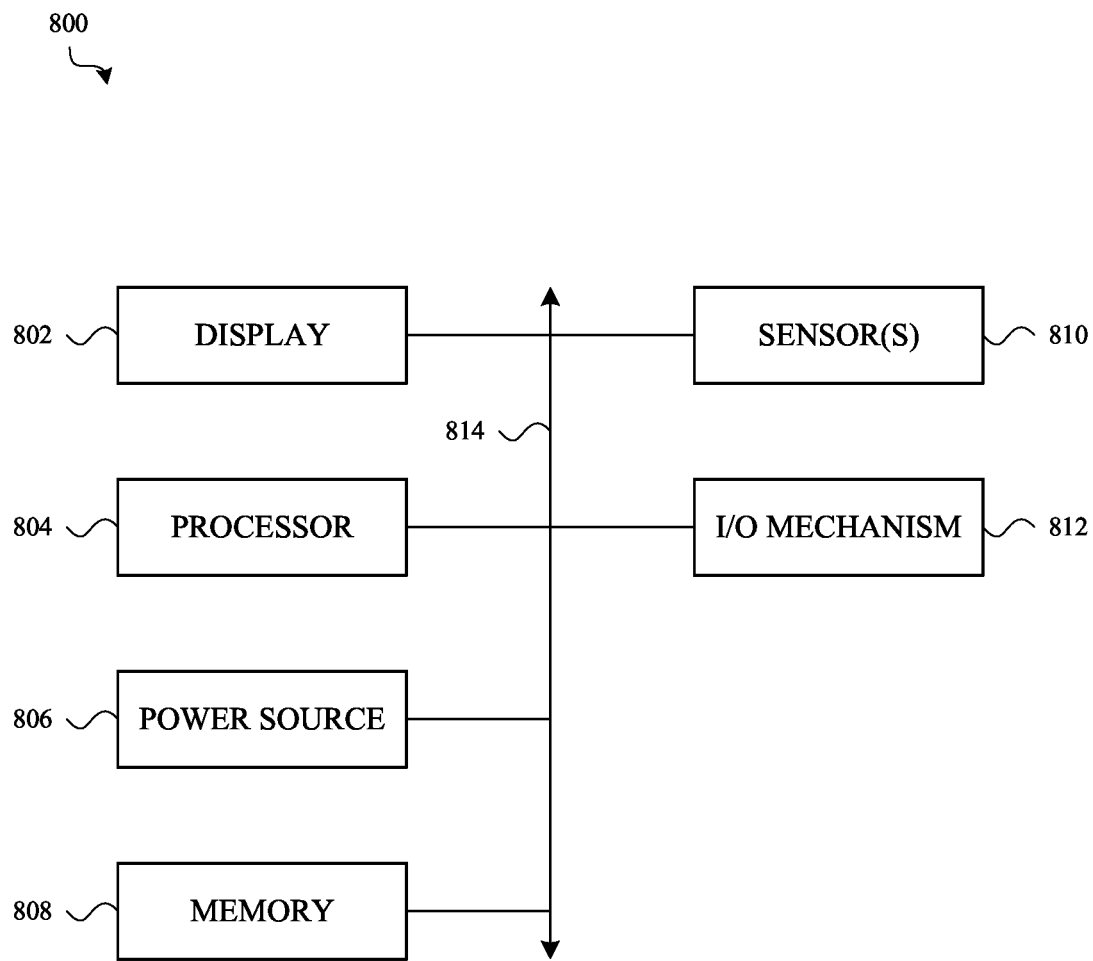
FIG. 8 shows a sample electrical block diagram of an electronic device.

FIG. 8 shows a sample electrical block diagram of an electronic device 800, which electronic device may in some cases be the device described with reference to FIG. 3, 4, 5, 6, or 7A-7B. The electronic device 800 may include an optional electronic display 802 (e.g., a light-emitting display), a processor 804, a power source 806, a memory 808 or storage device, a sensor system 810, or an input/output (I/O) mechanism 812 (e.g., an input/output device, input/output port, or haptic input/output interface). The processor 804 may control some or all of the operations of the electronic device 800. The processor 804 may communicate, either directly or indirectly, with some or all of the other components of the electronic device 800. For example, a system bus or other communication mechanism 814 can provide communication between the electronic display 802, the processor 804, the power source 806, the memory 808, the sensor system 810, and the I/O mechanism 812.

The processor 804 may be implemented as any electronic device capable of processing, receiving, or transmitting data or instructions, whether such data or instructions is in the form of software or firmware or otherwise encoded. For example, the processor 804 may include a microprocessor, a central processing unit (CPU), an application-specific integrated circuit (ASIC), a digital signal processor (DSP), a controller, or a combination of such devices. As described herein, the term "processor" is meant to encompass a single processor or processing unit, multiple processors, multiple processing units, or other suitably configured computing element or elements. In some cases, the processor 804 may provide part or all of the circuitry described with reference to FIGS. 1A-7B.

It should be noted that the components of the electronic device 800 can be controlled by multiple processors. For example, select components of the electronic device 800 (e.g., the sensor system 810) may be controlled by a first processor and other components of the electronic device 800 (e.g., the electronic display 802) may be controlled by a second processor, where the first and second processors may or may not be in communication with each other.

The power source 806 can be implemented with any device capable of providing energy to the electronic device 800. For example, the power source 806 may include one or more batteries, or one or more adapters for receiving one or more batteries. Additionally or alternatively, the power source 806 may include a power connector or power cord that connects the electronic device 800 to another power source, such as a wall outlet.

The memory 808 may store electronic data that can be used by the electronic device 800. For example, the memory 808 may store electrical data or instructions, or content such as, for example, audio and video files, documents and applications, device settings and user preferences, timing signals, control signals, and data structures or databases. The memory 808 may include any type of memory. By way of example only, the memory 808 may include random access memory, read-only memory, Flash memory, removable memory, other types of storage elements, or combinations of such memory types.

The electronic device 800 may also include a sensor system 810, including sensors positioned almost anywhere on the electronic device 800. In some cases, the sensor system 810 may include one or more coherent optical emitters and corresponding balanced coherent optical vibration sensors, positioned and/or configured as described with reference to any of FIGS. 1A-7B. The sensor system 810 may be configured to sense one or more type of parameters, such as but not limited to, vibration; light; touch; force; heat; movement; relative motion; biometric data (e.g., biological parameters) of a user; air quality; proximity; position; connectedness; matter type; and so on. By way of example, the sensor system 810 may include one or more of (or multiple of) a heat sensor, a position sensor, a proximity sensor, a light or optical sensor, an accelerometer, a pressure transducer, a gyroscope, a magnetometer, a health monitoring sensor, and an air quality sensor, and so on. Additionally, the sensor system 810 may utilize any suitable sensing technology, including, but not limited to, interferometric, magnetic, pressure, capacitive, ultrasonic, resistive, optical, acoustic, piezoelectric, or thermal technologies.

The I/O mechanism 812 may transmit or receive data from a user or another electronic device. The I/O mechanism 812 may include the electronic display 802, a touch sensing input surface, a crown, one or more buttons (e.g., a graphical user interface "home" button), one or more cameras (including an under-display camera, such as a selfie camera or a biometric authorization camera), one or more microphones or speakers, one or more ports such as a microphone port, and/or a keyboard. Additionally or alternatively, the I/O mechanism 812 may transmit electronic signals via a communications interface, such as a wireless, wired, and/or optical communications interface. Examples of wireless and wired communications interfaces include, but are not limited to, cellular and Wi-Fi communications interfaces.

The foregoing description, for purposes of explanation, uses specific nomenclature to provide a thorough understanding of the described embodiments. However, it will be apparent to one skilled in the art, after reading this description, that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art, after reading this description, that many modifications and variations are possible in view of the above teachings.

As described above, one aspect of the present technology may be the gathering and use of data available from various sources. The present disclosure contemplates that, in some instances, this gathered data may include personal information data that uniquely identifies a specific person, or can be used to locate, contact, or diagnose, a specific person, or can be used to eavesdrop or spy on a person. Such personal information data can include voice data, demographic data, location-based data, telephone numbers, email addresses, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to activate or deactivate various functions of the user's device, or gather performance metrics for the user's device or the user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States (US), collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users may selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

What is claimed is:

1. An electronic device, comprising:
   a microphone;
   an array of coherent optical emitters;
   an array of balanced coherent optical vibration sensors, each balanced coherent optical vibration sensor in the array of balanced coherent optical vibration sensors paired with a coherent optical emitter in the array of coherent optical emitters, each balanced coherent optical vibration sensor comprising:
      an optical frequency shifter;
      an optical beam splitter configured to direct a first portion of a beam of light emitted by a paired coherent optical emitter, in the array of coherent optical emitters, into a field of view, and to direct a second portion of the beam of light toward the optical frequency shifter; and
      a local oscillator configured to interfere a portion of the first portion of the beam of light, reflected from the field of view, with the optical frequency shifted second portion of the beam of light; and
   a camera positioned to capture an image of a field of view; and
   a processor configured to,
      analyze a set of waveforms acquired by the array of balanced coherent optical vibration sensors;
      identify, using the analysis of the set of waveforms, a set of one or more voices in the field of view;
      identify a set of one or more voice sources in the image;
      map the set of one or more voices to the set of one or more voice sources by,
         determining, based at least partly on the image, a first direction to a voice source in the set of one or more voice sources, the voice source producing a particular voice in the set of one or more voices;
         determining, based at least partly on a subset of waveforms including the particular voice, and based at least partly on a directionality of a subset of balanced coherent optical vibration sensors that generated the subset of waveforms, a second direction to the voice source; and
         correlating the first direction with the second direction to map the particular voice to the voice source; and
      adjust an output of the microphone to accentuate the particular voice.

2. The electronic device of claim 1, further comprising:
   at least one lens positioned to direct beams of light emitted by the array of coherent optical emitters in different directions.

3. The electronic device of claim 2, wherein the at least one lens comprises a lens that receives all of the beams of light emitted by the array of coherent optical emitters.

4. The electronic device of claim 2, wherein the at least one lens comprises an array of lenses and different lenses in the array of lenses receive different beams of light emitted by different coherent optical emitters.

5. The electronic device of claim 1, wherein the array of balanced coherent optical vibration sensors is at least partially provided using silicon photonics.

6. The electronic device of claim 1, wherein the processor is configured to adjust the output of the microphone by amplifying or filtering a particular frequency in the output of the microphone.

7. The electronic device of claim 1, wherein:
   the microphone is a directional microphone; and
   the processor is configured to adjust the output of the microphone by adjusting a directionality of the directional microphone.

8. The electronic device of claim 1, further comprising:
   a display; wherein,
   the array of coherent optical emitters and the array of balanced coherent optical vibration sensors are positioned behind the display.

9. The electronic device of claim 1, further comprising:
   a display; wherein,
   the array of coherent optical emitters and the array of balanced coherent optical vibration sensors are positioned adjacent an edge of the display.

10. The electronic device of claim 1, wherein the processor is configured to adjust the output of the microphone by filtering, from the output of the microphone, vibrations appearing in the set of waveforms that are not associated with the particular voice.

* * * * *